Aug. 11, 1964     A. C. HOWELL, JR     3,144,508
CONDUCTOR BAR
Filed Jan. 25, 1962
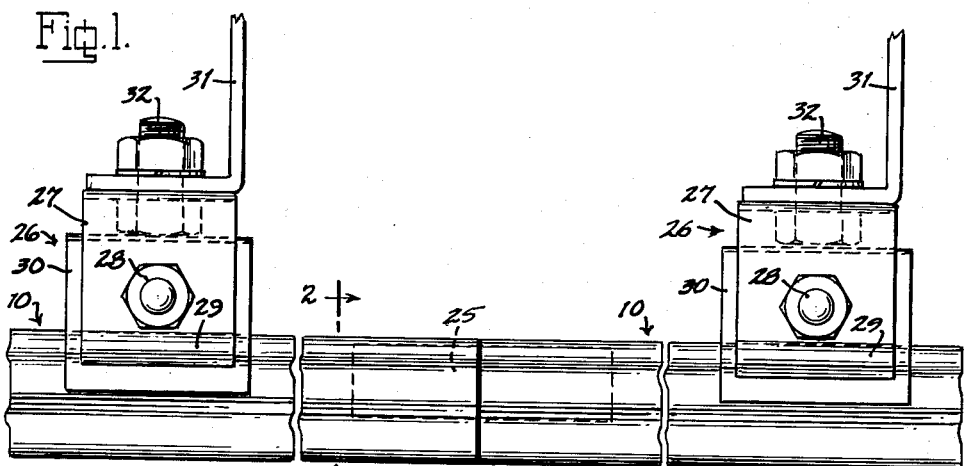
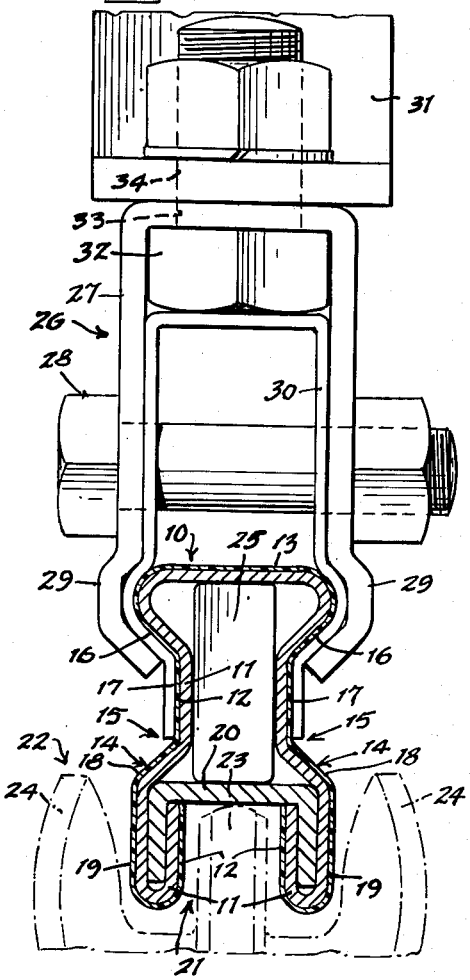
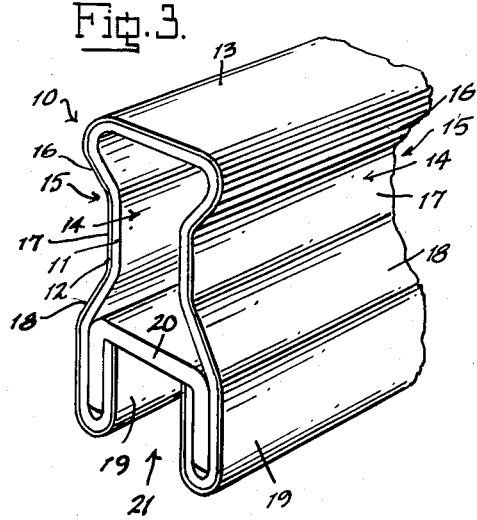
INVENTOR.
ALLEYNE C. HOWELL, JR.
BY
ATTORNEY

United States Patent Office 3,144,508
Patented Aug. 11, 1964

3,144,508
CONDUCTOR BAR
Alleyne C. Howell, Jr., 645 Mine Hill Road,
Fairfield, Conn.
Filed Jan. 25, 1962, Ser. No. 168,730
5 Claims. (Cl. 174—133)

The present invention relates to a conductor bar for electrical trolley systems such as monorails, cranes, hoists, and the like, wherein a stationary conductor bar is engaged by the brush or shoe of a current collecting head carried by an electric motor-driven vehicle or other mobile unit. An object of the invention is to provide a conductor bar of simple and inexpensive construction having a high degree of mechanical strength combined with high electrical conductivity, and wherein different metals may be employed best suited for obtaining maximum strength and electrical conductivity.

A further object is to provide a conductor bar which is effectually insulated to protect against accidental contact with the conductor bar. In particular it is proposed to provide insulation in the form of a relatively thin layer or coat of dielectric plastic material, as for instance polyvinyl chloride, bonded to a relatively thin sheet metal base, as for instance steel or aluminum, and which coated sheet metal base is shaped to provide a supporting shell for a conductor element for engagement by the current collecting brush or shoe, the plastic layer or coat providing an external insulating covering for the conductor bar, and the sheet metal base adding to the overall conducting capacity of the conductor bar.

It is therefore a further object of the invention to provide a conductor bar having a sheet metal shell provided with an insulating layer or coat bonded thereto whereby the shell functions as both a conductor and an insulator, thus enabling economy in the use of insulating material which can be restricted to the minimum required for dielectric strength. The relatively thin insulation also allows faster heat dissipation and therefore increased electrical capacity, thus permitting the use of less conducting metal for a given capacity. A further advantage is that the relatively thin insulation layer acquires the mechanical strength of the underlying sheet metal base, thus providing greater resistance to mechanical damage and distortion due to cold flow, and such as has been inherent in plastic insulation covers heretofore that depended on their own mechanical strength and structural shape to resist mechanical damage and distortion.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a fragmentary side elevational view of a conductor bar installation according to the invention;

FIG. 2 is an enlarged vertical sectional view taken along the line 2—2 of FIG. 1, the relative engaging position of the collector head being shown in dot-and-dash lines.

FIG. 3 is a perspective view of one end of a length of the conductor bar.

Referring to the drawing, the conductor bar according to the exemplary embodiment of the invention illustrated therein comprises a shell 10 formed from a composite sheet of material consisting of a sheet metal base 11 and an insulating layer or coat 12, of suitable dielectric material as for instance polyvinyl chloride, bonded to one side of the base, the sheet being shaped by suitable fabricating procedures into generally inverted U-form to provide a longitudinal horizontally disposed top wall 13 and side walls 14—14. The latter are provided with longitudinal indentations 15, each defined by a downwardly and inwardly inclined upper wall portion 16 bent in convexly curved relation from the top wall, a vertically disposed intermediate wall portion 17, and a downwardly and outwardly inclined lower wall portion 18. Below the lower wall portions 18 the side walls are in the form of U-shaped channels 19 which embrace the side walls of a conductor strip member 20 of inverted U-shaped channel form, the horizontal bridge portion of which constitutes the recessed downwardly directed contact face of a longitudinal guideway channel 21 having insulated side walls provided by the inner sides of the U-shaped channel portions 19 of the shell. In assembling the conductor member it is placed between the side walls of the shell against the inner sides of the lower wall portions 18, and thereupon the lower marginal portions of the side walls are bent into firmly crimped relation with the side walls of the conductor member to form the U-shaped channels 19.

The upper wall portions 16 and their convexly curved connections with the top wall portion 13 constitute longitudinal ridges at each side of the shell for gripping engagement by supporting hangers, as will presently more fully appear, and the lower wall portions 18 constitute abutment shoulders interiorly of the shell to prevent relative upward displacement of the conductor member through pressures exerted thereon by the brush or shoe of a current collector head 22 engaged therewith. The internal insulation surfaces of the channel portions 19 provide rigid metal reinforced insulation guides at each side of the guideway channel 21 for the sliding brush or shoe 23 of the collector head engaged with the downwardly directed contact surface of the bridge portion of the conductor member, and the external insulation surfaces restrict undue lateral movement of the cheeks or side plates 24—24 of the collector head.

In practice the conductor bar of the invention may be of any suitable size, but in a typical installation it is approximately one inch in its vertical dimension and is provided in 10-foot sections supported at 5-foot intervals by suspension hangers. The adjacent ends of the sections are joined by a connector bar 25 of suitable current conducting metal inserted in the adjacent ends, the connector bar being preferably dimensioned so that it tightly engages in the ends of the conductor bars in contact with the conductor member 20 to form an electrical connection between the adjacent sections. The relatively large space within the conductor bar also permits the use of a conductor wire connection between adjacent sections, if desired, in which case the connector bar may be suitably shaped to accommodate the wire connection.

The suspension hangers 26 each comprise an inverted U-shaped clamp member 27 having a tightening bolt 28 extending between its side walls, and provided at the lower ends of the side walls with angularly formed inwardly divergent clamping jaws 29—29 adapted to wedgingly engage the longitudinal ridges at the opposed sides of the conductor bar formed by the inclined portions 16 of the side walls and their convexly curved connections with the top wall 13. An insulation member 30, of fibre board or the like, of inverted U shape in cross-section is interposed between the sides of the clamp and the conductor bar. The clamp is supported upon an angle support 31 to which it is suitably connected by means of a bolt 32 engaged through apertures 33 and 34 respectively in the upper end of the clamp and in the angle support. The angle support, as will be understood, is suitably supported upon a ceiling or other suitable structure.

The conductor member 20 may be of any suitable conducting material depending upon the desired electrical capacity of the conductor bar without changing the dimensions of the rest of the structure. Thus it may be of steel, copper, copper-clad steel, stainless steel, galvanized steel, etc., and in the case of metals that are subject to oxidation or galvanic action it may be zincated or otherwise suitably coated. The metal base 11 of the shell may be formed of steel, aluminum or other suitable metal depending upon the desired properties of strength and electrical conductivity. By virtue of the fact that the shell is a separate piece from the conductor member 20 the construction permits the efficient use of aluminum as the base of the shell, aluminum being an excellent conductor but a poor metal for sliding contact since it forms an insulating surface of aluminum oxide. Where the diversity of the metals employed will result in galvanic action a suitable coating may be provided to prevent this. For example, aluminum employed as the base of the shell may be zincated to avoid galvanic action with a conductor member 20 of galvanized or zinc-coated steel or of copper. By virtue of the current conducting relationship between the conductor member and the sheet metal base of the shell the current conducting capacity of the conductor bar is the sum of their current conducting capacities.

The thin bonded insulation layer or coat 12 results in economy of insulation material, as it is only necessary to use the minimum required for dielectric strength. Also the thin insulation layer or coat provides for faster heat dissipation and increased electrical capacity, and therefore the use of less metal in the conductor bar for the required electrical capacity. The thin insulation layer or coat also acquires the mechanical strength of the underlying metal base against mechanical damage and distortion due to cold flow, and such as has occurred heretofore with polyvinyl chloride and other plastic covers which depend only on their own mechanical strength and structural shape to resist mechanical damage and distortion. This applies to the guideway channel 21 for the brush or shoe in which the metal reinforced insulated sides will not be deformed by heat or cracking as may occur where the sides of the guideway are formed of plastic alone. It also applies to the indented sides of the conductor bar where they are engaged by the supporting clamps, deformation being prevented in the vertical position of the clamping bar as illustrated or in any other mounting position.

What is claimed is:

1. A conductor bar comprising a longitudinally extending sheet metal shell of uniform metal thickness throughout including a transversely continuous top wall and downwardly extending transversely spaced side walls integral with said top wall, the upper portions of said side walls contiguous to said top wall having transversely aligned longitudinal indentations at their outer sides forming transversely aligned downwardly facing longitudinal shoulders at their inner sides in downwardly spaced relation to said top wall, and a separate conductor strip of strip metal of substantially greater thickness than the sheet metal thickness of said shell and having a current conducting capacity independent of that of said shell, said conductor strip being positioned within said shell in current conducting relationship therewith against said shoulders in spanning relation between said side walls and having a transversely disposed downwardly facing contact face, the portions of said side walls below said shoulders each consisting of an outer wall portion, a bend portion extending transversely inwardly from said outer wall portion, and an inner wall portion extending upwardly from said bend portion and having a longitudinal free edge in vertically opposed abutting relationship to said contact face of said conductor strip, said inner wall portions being in transversely opposed spaced relation to each other and their opposed surfaces constituting with said contact face of said conductor strip a downwardly open guideway channel, and the current conducting relationship between said conductor strip and said shell being such that the current conducting capacity of said conductor bar is the sum of the current conducting capacities of said conductor strip and said shell.

2. The conductor bar as defined in claim 1, further characterized by an insulating layer of dielectric plastic material bonded to and covering the entire outer surface of said sheet metal shell and extending to the free edges of said inner side wall portions thereof.

3. A conductor bar comprising a longitudinally extending sheet metal shell of uniform metal thickness throughout including a transversely continuous top wall and downwardly extending transversely spaced side walls integral with said top wall, the upper portions of said side walls contiguous to said top wall having transversely aligned downwardly facing longitudinal shoulders at their inner sides in downwardly spaced relation to said top wall, and a separate conductor strip of strip metal of inverted U-shape in cross-section including a bridge portion and side leg portions, said strip metal being of substantially greater thickness than the sheet metal thickness of said shell and having a current conducting capacity independent of that of said shell, said conductor strip being positioned within said shell in current conducting relationship therewith against said shoulders in spanning relation between said side walls with said bridge portion constituting a transversely disposed downwardly facing contact face, the portions of said side walls below said shoulders each consisting of an outer wall portion, a bend portion extending transversely inwardly from said outer wall portion, and an inner wall portion extending upwardly from said bend portion inwardly of a respective side leg portion of said conductor strip and having a longitudinal free edge in vertically opposed abutting relationship to said contact face of said conductor strip, said inner wall portions being in transversely opposed spaced relation to each other and their opposed surfaces constituting with said contact face of said conductor strip a downwardly open guideway channel, and the current conducting relationship between said conductor strip and said shell being such that the current conducting capacity of said conductor bar is the sum of the current conducting capacities of said conductor strip and said shell.

4. The conductor bar as defined in claim 3, further characterized by an insulating layer of dielectric plastic material bonded to and covering the entire outer surface of said sheet metal shell and extending to the free edges of said inner side wall portions thereof.

5. A conductor bar comprising a longtudinally extending shell consisting of a bent-to-form laminate comprising a sheet metal base of uniform metal thickness throughout and an insulation layer of dielectric plastic material bonded to and entirely covering the outwardly disposed side of said base, said shell including a transversely continuous top wall and downwardly extending transversely spaced side walls integral with said top wall, the upper portions of said side walls contiguous to said top wall having transversely aligned longitudinal indentations at their outer sides forming transversely aligned downwardly facing longitudinal shoulders at their inner sides in downwardly spaced relation to said top wall, and a separate conductor strip of strip metal of substantially greater thickness than the sheet metal thickness of said base and having a current conducting capacity independent of that of said base, said conductor strip being positioned within said shell in current conducting relationship therewith against said shoulders in spanning relation between said side walls and having a transversely disposed downwardly facing contact face, the portions of said side walls below said shoulders each consisting of an outer wall portion, a bend portion extending transversely inwardly from said outer wall portion, and an inner wall portion extending upwardly from said bend portion and having a longitudinal free edge in vertically opposed abutting relationship to said contact face of said conductor strip, said inner wall portions being in transversely opposed spaced relation to each other and their opposed surfaces constituting the insulated sides of a downwardly open guideway channel of which said contact face is the base and the current conducting relationship between said conductor strip and said shell being such that the current conducting capacity of said conductor bar is the sum of the current conducting capacities of said conductor strip and said shell.

References Cited in the file of this patent

UNITED STATES PATENTS

| | | |
|---|---|---|
| 2,096,579 | Frank et al. | Oct. 19, 1937 |
| 2,082,281 | Frank | June 1, 1937 |
| 2,835,752 | Anjeskey et al. | May 20, 1958 |

FOREIGN PATENTS

| | | |
|---|---|---|
| 616,093 | Canada | Mar. 7, 1961 |